United States Patent [19]
Pellico

[11] 3,923,754

[45] Dec. 2, 1975

[54] CURING OF LIQUID POLYTHIOPOLYMERCAPTAN POLYMERS

[75] Inventor: Michael A. Pellico, Los Angeles, Calif.

[73] Assignee: Denton Industries, Inc., Los Angeles, Calif.

[22] Filed: Oct. 29, 1974

[21] Appl. No.: 518,378

Related U.S. Application Data

[63] Continuation-in-part of Ser. No. 414,893, Nov. 12, 1973, abandoned.

[52] U.S. Cl............ 260/79; 260/37 R; 260/31.8 Z; 260/79.1
[51] Int. Cl.².......................................... C08G 75/00
[58] Field of Search.................... 260/79, 79.1, 37 R

[56] References Cited
UNITED STATES PATENTS

| | | | |
|---|---|---|---|
| 3,487,052 | 12/1969 | Millen et al............................ | 260/79 |
| 3,586,660 | 6/1971 | Sakata et al........................... | 260/79 |
| 3,637,574 | 1/1972 | Millen................................... | 260/79 |

*Primary Examiner*—Melvyn I. Marquis
*Attorney, Agent, or Firm*—Donald Diamond

[57] ABSTRACT

Liquid organic polythiopolymercaptan polymers are cured at ambient temperature conditions within a time span not exceeding about 15 minutes to produce light colored, solid, elastomeric products by employing, as the curing agent, at least 20 parts by weight of a polysulfide constituent such as alkyl thiuram polysulfide and/or benzothiazyl disulfide in combination with at least 20 parts by weight of a zinc constituent such as zinc oxide and/or zinc peroxide, with the amount of each of the polysulfide and zinc constituents being based upon about 100 parts, by weight, of the polymer.

12 Claims, No Drawings

CURING OF LIQUID POLYTHIOPOLYMERCAPTAN POLYMERS

CROSS-REFERENCE TO RELATED APPLICATION

This application is a continuation-in-part of U.S. Pat. Application No. 414,893 filed Nov. 12, 1973, and entitled Curing Of Liquid Polythiopolymercaptan Polymers and now abandoned.

BACKGROUND OF THE INVENTION

This invention relates to the curing of liquid organic polythiopolymercaptan polymers with curing compositions containing critical, minimum amounts of a zinc constituent and a polysulfide constituent to produce, within a time span not exceeding about 15 minutes, light-colored, solid, elastomeric products having good physical properties with respect to elongation, tear strength and deflection memory.

Liquid organic polythiopolymercaptan polymers, sometimes herein referred to as polysulfide polymers, are well known room temperature vulcanizates in that they can be cured at ambient temperature conditions by blending an appropriate catalyst therewith. Polysulfide polymers, which have an average molecular weight from 1,000 to 8,000 and an average viscosity from 9.5 to 1,100, are available from Thiokol Chemical Corporation under the registered trademark LP.

Liquid Polysulfide polymers having a molecular weight from about 500 to about 25,000 can be produced by the method described in U.S. Pat. No. 2,466,963 (Patrick et al., 1949). The polysulfide polymers are characterized by recurring polysulfide linkages between organic radicals having at least two primary carbon atoms for connection to disulfide linkages. These polymers have a general structure corresponding to the formula HS (RSS)$_n$RSH were R indicates an organic radical, for example, a divalent aliphatic radical such as diethylformal, and $n$ is an integer which, for the liquid polymers, is in the general range of 2 to 60.

In commercial practice, the liquid polysulfide polymers may be produced by initially condensing an organic dihalide radical, corresponding to R, with a polysulfide in the presence of a polyfunctional cross-linking agent such as trichloropropane and, thereafter, splitting the resulting condensation polymer by the method described in U.S. Pat. No. 2,466,963 to form liquid polymers of lower molecular weight.

The liquid polymers, when cured, form rubber-like, elastomeric solids having useful properties. The elastomeric solids are described as being inert to oil and to most organic solvents as well as to water, mild acids and alkalies and they are not affected by ozone or sunlight. Liquid polysulfide polymers are promoted and sold for use in the preparation of catalyzed compositions which can be employed as impregnating, sealing, caulking, coating and potting materials as well as dental impression material.

The present invention, although not limited thereto, is concerned with the use of liquid polysulfide polymers in the preparation of dental impression material.

The liquid polysulfide polymer which has been found to be particularly suitable for use in dental impression materials is sold by Thiokol Chemical Corporation under the trade designation Thiokol LP-2. The chemical composition of LP-2 is believed to be a polyfunctional mercaptan polymer having a structure corresponding to the formula.

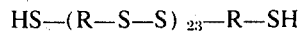

wherein R represents the organic group

The LP-2 polysulfide polymer has a molecular weight of about 4,000, a viscosity of about 400 poises at 25°C., and contains 2 mol percent trifunctional groups which are available for molecular cross-linking.

In the dental profession, it is often necessary for the dentist to obtain a negative pattern, in solid form, of all or a portion of a patient's mouth particularly in the area of the teeth and gums. These negative patterns are generally referred to as dental impressions. The dental impression is then employed as the first step in the making of a correctly fitting dental appliance for the patient by methods well known in the art.

Liquid polysulfide polymers when intermixed with a curing agent and formulated to have a paste-like consistency are extensively used by dentists as impression material because they flow completely around the area of treatment, reproduce a very accurate impression of the same and set to a removable, elastomeric solid at body temperature within a short period of time.

In this connection, it is conventional to supply the dentist with a two-component system containing the polysulfide polymer in the first component and the curing agent in the second component. Typically, the liquid polysulfide polymer is formulated with a filler such as a titanium dioxide and a vehicle such as dibutylpthalate and passed through a three-roll mill to obtain a dispersion having a paste-like consistency which is then packaged in a suitable extrusion tube. Likewise, the curing agent is formulated with a vehicle such as dibutylphthalate and, if desirable, a filler such as titanium dioxide and the resulting blend is passed through a three-roll mill to obtain a paste-like dispersion which is packaged in a suitable extrusion tube. The first and second components are formulated such that the dispensing and mixing of substantially equal volumes thereof will result in appropriate concentrations of polysulfide polymer and curing agent being intermixed to produce the desired dental impression material.

Lead peroxide is extensively employed as the curing agent for liquid polysulfide polymers used as dental impression material. However, this curing agent is disadvantageous for dental applications because it is toxic, stains skin and clothing and the dark brown color imparted to the impression material by the lead compound makes the material aesthetically unpleasant for oral application.

PRIOR ART

It is disclosed in U.S. Pat. No. 3,046,248 (Molnar, 1962), that inorganic metallic hydroxides, such as cupric hydroxide, are effective as curing agents for polymerizing Thiokol LP-2 liquid polysulfide polymer at ambient temperature conditions and that the rate of cure can be enhanced by incorporating into the system a reaction promoting agent such as elemental sulfur or an organic amine. The patentee concluded that the labile hydroxy radical attached to the metal of the inorganic hydroxide is the functional portion of the curing agent since compounds without the hydroxy radical as, for example, cupric chloride, cuprous chloride, cupric oxide, cuprous oxide, and litharge (lead monoxide)

were observed not to exhibit any tendency in curing liquid polysulfide polymers.

U.S. Pat. No. 3,629,206 (Stephenson et al., 1971) discloses a method for curing liquid polysulfide polymers such as LP-2 and LP-32 to produce a light colored, cured, solid, elastomeric product at room temperature which comprises interacting the polysulfide polymer with a curing system consisting essentially of an alkyl thiuram polysulfide such as tetramethyl thiuram disulfide and a lead salt such as lead silicate. The patentees point out that in contrast to the results obtained by curing polysulfide polymers with their combination of lead salts and thiurams, other rather similar oxides and salts such as calcium oxide, calcium hydroxide, barium oxide, barium hydroxide, barium carbonate, magnesium oxide, magnesium carbonate, lead monoxide, and lead dioxide are either much less effective with the thiurams, or give some discoloration, and can actually be deleterious rather than contributing to a good cure.

U.S. Pat. No. 3,637,574 (Millen, 1972) discloses a method for curing liquid polysulfide polymers such as LP-2 at ambient atmospheric temperatures within about 45 to 60 minutes which comprises interacting the polymer with a curing system containing 3 to 15 parts by weight of a zinc compound such as zinc oxide or zinc peroxide and 3 to 18 parts by weight of tetraalkylthiuram polysulfide such as tetramethylthiuram disulfide and modified by the addition of 0.01 to 10 parts by weight of elemental sulfur, with the aforesaid parts by weight being based upon 100 parts by weight of the polymer. The patentee points out that the addition of sulfur to the formulation improves the physical properties of the cured polymer with respect to tensile strength, elongation and modulus.

SUMMARY OF THE INVENTION

In accordance with this invention, it has been discovered that liquid organic polythiopolymercaptan polymers can be cured at ambient temperature conditions, within a time span not exceeding about 15 minutes, to produce light colored, solid, elastomeric products having good physical properties with respect to elongation, tear strength and deflection memory by employing a curing agent system containing at least 20 parts by weight of a zinc constituent and at least 20 parts by weight of a sulfur yielding polysulfide constituent, with the weights thereof being based upon about 100 parts by weight of the polymer.

Thus, in a first aspect, this invention is directed to a method for curing a liquid polysulfide polymer within a time span not exceeding about 15 minutes which comprises interacting the polymer with (a) at least 20 parts by weight of a zinc constituent selected from the class of zinc oxide, zinc peroxide and mixtures thereof, and (b) at least 20 parts by weight of a polysulfide constituent selected from the class of alkyl thiuram polysulfide, benzothiazyl disulfide and mixtures thereof, with the amount of each of the zinc and polysulfide constituents being based upon 100 parts by weight of the polymer.

In a second aspect, this invention is directed to a cured, elastomeric product made by the process defined in the aforesaid first aspect.

In a third aspect, this invention is directed to a two-component system, wherein the components are adapted to interact to form a cured, elastomeric product within a time span not exceeding about 15 minutes, comprising:

component A containing a liquid organic polythiopolymercaptan polymer;

component B containing at least 20 parts by weight of a zinc constituent selected from the class of zinc oxide, zinc peroxide and mixtures thereof; and at least 20 parts by weight of a polysulfide constituent selected from the class of alkyl thiuram polysulfide, benzothiazyl disulfide and mixtures thereof, said polysulfide constituent being present in at least one of the aforesaid components, with the amount of each of the zinc and polysulfide components being based upon about 100 parts by weight of the polymer.

DETAILED DESCRIPTION

The liquid polysulfide polymers, which can be cured with the curing agents of this invention, have a molecular weight from about 500 to about 25,000 and a general structure corresponding to the formula $HS(RSS)_nRSH$ wherein R is an organic radical, S is sulfur and $n$ is an integer. When solid elastomeric products are desired, the average molecular weight of the liquid polysulfide polymer should be greater than 1000 and, preferably, at least about 4000. When the liquid polysulfide polymer is to be used in dental impression materials, the average molecular weight may advantageously be in the range from about 3000 to about 5000. The polysulfide polymers which are particularly well suited for curing in accordance with this invention include those available under the trade designation Thiokol LP-2 and Thiokol LP-32. The LP-2 polymer, as previously indicated, has a molecular weight of about 4000, a viscosity of about 400 poises at 25°C., and contains 2 mol percent trifunctional groups which are available for molecular cross-linking. The LP-32 polymer has a molecular weight of about 4000, a viscosity of about 400 poises at 25°C, and contains 0.5 mol percent trifunctional groups which are available for molecular cross-linking.

The curing agent system of this invention which can be employed to effectively and rapidly cure liquid polysulfide polymers at ambient temperature conditions comprises a zinc constituent in combination with a polysulfide constituent. The zinc constituent is, preferably, zinc oxide, zinc peroxide or mixtures thereof. The polysulfide portion of the curing combination is, advantageously, benzothiazyl disulfide, alkyl thiuram polysulfide or mixtures thereof. The alkyl thiuram polysulfides which can be utilized in the invention are represented by the formula

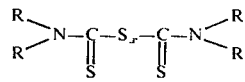

wherein $x$ is 2, 3, 4, 5 or 6 and R represents an alkyl or cycloalkyl group containing up to and including 10 carbon atoms, and the R's attached to a terminal nitrogen atom can be joined to form with the nitrogen atom a heterocyclic structure. Examples of such compounds include tetramethyl thiuram disulfide, tetraethyl thiuram disulfide, tetrabutyl thiuram disulfide, tetraamyl thiuram disulfide, tetraoctyl thiuram disulfide, tetradecyl thiuram disulfide, tetracyclohexyl thiuram disulfide, tetraethyl thiuram trisulfide, dipentamethylene thiuram tetrasulfide, dipentamethylene thiuram hexasulfide and the like.

In order to cure the liquid polysulfide polymer within a time span not exceeding about 15 minutes, at least 20 parts by weight of the polysulfide constituent must be present in the formulation per 100 parts by weight of the polymer. The upper limit for the polysulfide constituent is about 40 parts by weight per 100 parts by weight of the polymer. Thus, the broad range for the polysulfide constituent is from 20 to about 40 parts by weight with a preferred range being from 20 to about 30 parts by weight.

Although liquid polysulfide polymers can be cured within 15 minutes by employing a curing agent system containing at least 20 parts by weight of a polysulfide constituent and less than 20 parts by weight of a zinc constituent as, for example, 10 parts by weight of a zinc constituent, it has been observed that in order for the cured polymer to have good physical properties with respect to elongation, tear strength and deflection memory, at least 20 parts by weight of the zinc constituent should be present in the formulation per 100 parts by weight of the polymer. The broad range for the zinc constituent is from 20 to about 60 parts by weight, with an intermediate range being from about 25 to about 55 parts by weight, and a preferred range being from about 35 to about 45 parts by weight, with the aforesaid parts by weight being based upon 100 parts by weight of the polymer.

As previously indicated, it is conventional to supply to purchasers and users the uncured liquid polysulfide polymer as a first component and the curing agent as a second component, with the first and second components formulated to have paste-like consistencies when they are to be interacted to form dental impression material. While the polysulfide constituent may be included with the liquid polysulfide polymer in the first component or divided between the first and second components, it is preferred to include the polysulfide constituent solely within the second component containing the zinc constituent in order to provide a two-component system having enhanced stabilization with respect to shelf life.

The two component system of this invention is particularly well adapted for use as dental impression material, since the components, after being intermixed, will set to a light colored, cured, elastomeric product at temperatures between about 70° and about 100°F.

within a short time, i.e. 15 minutes. For convenient oral application, the concentration of the curing constituents with respect to the liquid polysulfide polymer should be selected such that the cure time or set time will be about 10 minutes or so.

With respect to the novel features of this invention, it was found that other rather similar metallic oxides such as antimony oxide, magnesium oxide, stannic oxide and zirconium oxide in combination with tetramethyl thiuram disulfide were not effective as curing agents for liquid polysulfide polymers for use as dental impression material since the intermixtures of the curing agent and the uncured polymer did not set within 1 hour.

EXAMPLES

The following examples further illustrate this invention. In the tables, tetramethyl thiuram disulfide is abbreviated as "TMTD," dibutyl phthalate is abbreviated as "DBP," and LP-2 is the trade designation for the liquid polysulfide polymer hereinbefore identified. The term "working life" refers to that time required to achieve a non-pourable consistency which is the first stage of curing. The term "cure time" refers to the time required for the material to set to a solid, elastomeric product. The blending of the ingredients and the curing step in each instance was conducted at about room temperature, that is, about 72°F. The curing component was prepared by blending the curing additives with dibutyl phthalate to obtain a paste-like composition which was then mixed with the uncured liquid polysulfide polymer to initiate curing.

EXAMPLE I

This example shows the use of zinc oxide and TMTD as a curing composition for LP-2 with the concentration of zinc oxide varying from 0.0 to 40 parts by weight per 100 parts by weight of LP-2 while the concentration of TMTD is held constant at 20 parts by weight per 100 parts by weight of LP-2.

TABLE I

| Ingredients | Parts by Weight | | | | | |
|---|---|---|---|---|---|---|
| | 1(a) | 1(b) | 1(c) | 1(d) | 1(e) | 1(f) |
| LP-2 | 100 | 100 | 100 | 100 | 100 | 100 |
| TMTD | 20 | 20 | 20 | 20 | 20 | 20 |
| Zinc Oxide | 0 | 5 | 10 | 20 | 30 | 40 |
| DBP | 30 | 30 | 30 | 30 | 30 | 40 |
| Working Life (Min.) | Infin. | 15.5 | 8 | 5 | 5 | 5 |
| Cure Time (Min.) | None | 25 | 15 | 9 | 9 | 8.5 |

EXAMPLE II

This example shows the use of zinc oxide and TMTD as a curing composition for LP-2 with the concentration of TMTD varying from 0.0 to 25 parts by weight per 100 parts by weight of LP-2 with the concentration of zinc oxide held constant at 50 parts by weight per 100 parts by weight of LP-2.

TABLE II

| Ingredients | Parts by Weight | | | | | |
|---|---|---|---|---|---|---|
| | 2(a) | 2(b) | 2(c) | 2(d) | 2(e) | 2(f) |
| LP-2 | 100 | 100 | 100 | 100 | 100 | 100 |
| TMTD | 0 | 5 | 10 | 15 | 20 | 25 |
| Zinc Oxide | 50 | 50 | 50 | 50 | 50 | 50 |
| DBP | 40 | 40 | 40 | 40 | 50 | 50 |
| Working Life | >5 h. | >5 h. | 2.5 h. | 30 m. | 8 m. | 5 m. |

TABLE II-continued

| Ingredients | Parts by Weight | | | | | |
|---|---|---|---|---|---|---|
| | 2(a) | 2(b) | 2(c) | 2(d) | 2(e) | 2(f) |
| Cure Time | >23 h. | >15 h. | 6 h. | 50 m. | 12 m. | 8.5 m. | h. = hours
m. = minutes

EXAMPLE III

This example shows the use of zinc peroxide and TMTD as a curing composition for LP-2.

TABLE III

| Ingredients | Parts by Weight | |
|---|---|---|
| | 3(a) | 3(b) |
| LP-2 | 100 | 100 |
| TMTD | 20 | 30 |
| Zinc Peroxide | 30 | 50 |
| DBP | 20 | 20 |
| Working Life (Min.) | 10 | 7 |
| Cure Time (Min.) | 15 | 12 |

EXAMPLE IV

In this example, other metallic oxides, namely, antimony oxide, magnesium oxide, stannic oxide and zirconium oxide were employed together with TMTD as curing compositions for LP-2 in accordance with the formulations set forth in Table IV.

TABLE IV

| Ingredients | Parts by Weight | | | | | | |
|---|---|---|---|---|---|---|---|
| | 4(a) | 4(b) | 4(c) | 4(d) | 4(e) | 4(f) | 4(g) |
| LP-2 | 100 | 100 | 100 | 100 | 100 | 100 | 100 |
| TMTD | 20 | 30 | 20 | 30 | 20 | 20 | 20 |
| DBP | 20 | 20 | 20 | 20 | 20 | 20 | 20 |
| Antimony Oxide | 50 | | | | | | |
| Magnesium Oxide | | 20 | 30 | 30 | 50 | | |
| Stannic Oxide | | | | | | 50 | |
| Zirconium Oxide | | | | | | | 50 |

None of the formulations listed in Table IV set to a cured, solid, elastomeric product within one hour.

EXAMPLE V

This example illustrates the preparation of a two-component, paste-like system which is particularly adapted for use as dental impression material.

V(a)

To a mixture containing 100 grams of LP-2 and 5 grams of DBP, there is added, with agitation, 10 grams of titanium dioxide to obtain a paste-like dispersion (component A).

Thirty-five grams of zinc oxide and 20 grams of TMTD are added, with agitation, to 30 grams of DBP to obtain a paste-like dispersion (component B).

Components A and B are thoroughly mixed with a spatula on a pad and the resulting mixture sets to a light colored, cured, solid, elastomeric product in 10 minutes.

V(b)

To a mixture containing 100 grams of LP-2 and 5 grams of DBP, there is added, with agitation, 30 grams of titanium dioxide to obtain a paste-like dispersion (component A).

Thirty-five grams of zinc oxide and 25 grams of TMTD are added, with agitation, to 25 grams of DBP to obtain a paste-like dispersion (component B).

Components A and B are thoroughly mixed with a spatula on a pad and the resulting mixture sets to a light colored, cured elastomeric product in 8½ minutes.

EXAMPLE VI

This example shows the use of zinc oxide in combination with (a) tetramethyl thiuram disulfide (TMTD), (b) tetraethyl thiuram disulfide (TETD), (c) tetrabutyl thiuram disulfide (TBTD), and (d) benzothiazyl disulfide (BTD) as curing systems for LP-2.

TABLE V

| Ingredients | Weight, grams | | | |
|---|---|---|---|---|
| | 6(a) | 6(b) | 6(c) | 6(d) |
| LP-2 | 60 | 60 | 60 | 60 |
| DBP | 5 | 5 | 5 | 5 |
| ZnO | 15 | 15 | 15 | 15 |
| TMTD | 20 | | | |
| TETD | | 20 | | |
| TBTD | | | 20 | |
| BTD | | | | 20 |
| Cure Time (Min.) | 11.5 | 11.75 | 4.3 | 15.75 |

EXAMPLE VII

This example shows the use of zinc oxide in combination with tetraethyl thiuram disulfide (TETD) and dipentamethylene thiuram hexasulfide (DPTH) as curing systems for LP-2.

TABLE VI

| Ingredients | Weight, grams | |
|---|---|---|
| | 7(a) | 7(b) |
| LP-2 | 100 | 100 |
| TiO$_2$ | 5 | 5 |
| DBP | 10 | 10 |
| ZnO | 20 | 20 |
| TETD | 10 | 12 |
| DPHT | 10 | 12 |
| Cure Time (Min.) | 9.5 | 9 |

In view of the foregoing description and examples, it will become apparent to those of ordinary skill in the art that equivalent modifications thereof may be made without departing from the spirit and scope of this invention.

That which is claimed is:

1. A method of curing a liquid organic polythiopolymercaptan polymer at ambient temperature within a time span not exceeding about 15 minutes which comprises interacting the polymer at ambient temperature with
a. at least 20 parts by weight of a zinc constituent selected from the class of zinc oxide, zinc peroxide and mixtures thereof, and
b. at least 20 parts by weight of a polysulfide constituent selected from the class of alkyl thiuram polysulfide, benzothiazyl disulfide and mixtures thereof, with the amount of each of the zinc and polysulfide constituents being based upon about 100 parts, by weight, of the polymer.

2. The method of claim 1 wherein the amount of the zinc constituent is from 20 to about 60 parts by weight and the amount of the polysulfide constituent is from about 20 to about 40 parts by weight.

3. The method of claim 1 wherein the amount of the polysulfide constituent is from 20 to about 30 parts by weight.

4. The method of claim 3 wherein the amount of the zinc constituent is from about 25 to about 55 parts by weight.

5. The method of claim 3 wherein the amount of the zinc constituent is from about 35 to about 45 parts by weight.

6. The method of claim 1 wherein the polymer has an average molecular weight from about 500 to about 25,000.

7. The method of claim 1 wherein the polymer has an average molecular weight from about 1,000 to about 8,000.

8. The method of claim 1 wherein the polymer has an average molecular weight from about 3,000 to about 5,000.

9. The method of claim 1 wherein the polymer has an average molecular weight of about 4,000 and contains from about 0.5 to about 2.0 mol percent trifunctional groups for cross-linking and is represented by the formula

in which R represents the organic group $(C_2H_4-O-CH_2-O-C_2H_4)$

10. The method of claim 1 wherein the polysulfide constituent is represented as alkyl thiuram polysulfide represented by the formula

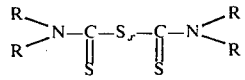

wherein $x$ is 2, 3, 4, 5 or 6 and R is an alkyl or cycloalkyl group containing up to and including 10 carbon atoms, and the R's attached to a terminal nitrogen atom can be joined to form with said nitrogen atom a heterocyclic structure.

11. A cured, elastomeric product made by the process of claim 1.

12. A two-component system, wherein the components are adapted to interact at ambient temperature to form a cured, elastomeric product within a time span not exceeding about 15 minutes, comprising:
component A containing a liquid organic polythiopolymercaptan polymer;
component B containing at least 20 parts by weight of a zinc constituent selected from the class of zinc oxide, zinc peroxide and mixtures thereof; and
at least 20 parts by weight of a polysulfide constituent selected from the class of alkyl thiuram polysulfide, benzothiazyl disulfide and mixtures thereof, said polysulfide constituent being present in at least one of said components;
with the amount of each of the zinc and polysulfide constituents being based upon about 100 parts, by weight, of the polymer.

* * * * *